(12) United States Patent
Ando et al.

(10) Patent No.: US 7,004,297 B2
(45) Date of Patent: Feb. 28, 2006

(54) DRIVE POWER TRANSMISSION DEVICE

(75) Inventors: Junji Ando, Kariya (JP); Naoyuki Sakai, Anjo (JP); Akiyoshi Tashiro, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/649,730

(22) Filed: Aug. 28, 2003

(65) Prior Publication Data

US 2004/0134736 A1 Jul. 15, 2004

(30) Foreign Application Priority Data

Aug. 29, 2002 (JP) ........................................ 2002-250036

(51) Int. Cl.
*F16D 13/04* (2006.01)

(52) U.S. Cl. .................... 192/35; 192/84.7; 192/107 M
(58) Field of Classification Search .................. 192/35, 192/48.2, 84.7, 107 R, 107 M
See application file for complete search history.

(56) References Cited

U.S. PATENT DOCUMENTS

| | | | |
|---|---|---|---|
| 4,958,712 A | | 9/1990 | Suganuma et al. |
| 4,988,421 A | * | 1/1991 | Drawl et al. ............. 204/192.3 |
| 5,242,040 A | | 9/1993 | Koitabashi |
| 5,404,980 A | * | 4/1995 | Shafer ...................... 192/84.96 |
| 5,551,546 A | * | 9/1996 | Tabayama et al. ........ 192/84.96 |
| 5,735,375 A | * | 4/1998 | Booth et al. ........... 192/84.961 |
| 5,996,759 A | * | 12/1999 | Aoki et al. ............. 192/84.951 |
| 6,006,869 A | | 12/1999 | Rancourt et al. |
| 6,098,770 A | * | 8/2000 | Isley, Jr. ....................... 192/35 |
| 6,136,386 A | * | 10/2000 | Nakahigashi et al. ........ 427/536 |
| 6,158,561 A | * | 12/2000 | Sakai et al. .................... 192/35 |
| 6,652,969 B1 | * | 11/2003 | Murakami et al. .......... 428/408 |
| 6,719,115 B2 | * | 4/2004 | Rogner et al. .......... 192/85 CA |

FOREIGN PATENT DOCUMENTS

| | | |
|---|---|---|
| EP | 03-292385 | 12/1991 |
| EP | 0 810 384 | 12/1997 |
| EP | 0 947 720 | 10/1999 |
| JP | 2001-295863 | 10/2001 |

OTHER PUBLICATIONS

U.S. Appl. No. 10/290,146, filed Nov. 8, 2002, Sakai et al.
U.S. Appl. No. 10/404,347, filed Apr. 2, 2003, Ando et al.

* cited by examiner

*Primary Examiner*—Saul Rodriguez
(74) *Attorney, Agent, or Firm*—Oblon, Spivak, McClelland, Maier & Neustadt, P.C.

(57) ABSTRACT

A drive power transmission device is disclosed having a drive mechanism for transmitting a drive power between first and second rotary members rotatable relative to each other, by the operation of an electromagnetic type clutch mechanism which brings a friction clutch into connection. A magnetic path generated around an electromagnet of the electromagnetic type clutch mechanism includes a clutch magnetic path in which a magnetic flux passes to reciprocate plural times across th friction clutch, and diamond-like carbon surface treatment is given on a part or all of the friction contact surfaces of the friction clutch to form a hard amorphous carbon film thereon. Thus, the transmission device can be constructed using a smaller number of the outer and inner plates for the electromagnetic type clutch mechanism, so that it can take a small construction with a longer durability life.

10 Claims, 6 Drawing Sheets

DRIVE POWER TRANSMISSION DEVICE

INCORPORATION BY REFERENCE

This application is based on and claims priority under 35 U.S.C. sctn. 119 with respect to Japanese Application No. 2002-250036 filed on Aug. 29, 2002, the entire content of which is incorporated herein by reference.

BACKGROUND OF THE INVENTION

1. Field of the Invention

The present invention relates to a drive power transmission device such as an electromagnetic type starting clutch incorporated in a drive power train of a vehicle or such as, in particular, an electromagnetic type coupling interposed between a front wheel drive train and a rear wheel drive train in a four-wheel vehicle.

2. Discussion of the Related Art

A drive power transmission device 1 in the prior art will be described hereafter with reference to FIGS. 13 to 19.

In the prior art device, when an electric current is applied to an electromagnet 33 of an electromagnetic type clutch mechanism 30, a magnetic path (M) schematically shown by the broken line is generated around the electromagnet 33, and an armature 31 is attracted toward the electromagnet 33, so that outer plates 44 and inner plates 45 of a pilot friction clutch 32 are brought into friction contact. When a relative rotation occurs between an outer case 14 and an inner case 17, a torque generated at a cam mechanism 29 is converted into a thrust force acting in the direction of the rotational center axis 14a. A main friction clutch 28 is connected in proportion to the thrust force, whereby the drive power is transmitted between the outer case 14 and the inner case 17.

On the contrary, when no electric current is applied to the electromagnet 33 of the electromagnetic type clutch mechanism 30, the aforementioned magnetic path (M) is not generated around the electromagnet 33, and the armature 31 is released from the attraction toward the electromagnet 33. Thus, the main friction clutch 28 is brought into disconnection thereby to release the driving connection between the outer case 14 and the inner case 17.

The aforementioned magnetic path (M) includes a clutch magnetic path 61 whose magnetic flux passes to reciprocate once across the pilot friction clutch 32. Gas soft-nitriding surface treatment using a special gas is effected on friction contact surfaces of the outer plates 44 and friction contact surfaces of the inner plates 45.

For a smaller size and a reduced cost of the drive power transmission device 1, it may be conceivable to reduce the number of the plates 44, 45 of the pilot friction clutch 32. However, if an attempt is made to reduce the number of the plates 44, 45, the friction contact area which a smaller number of the plates 44, 45 provide is decreased, whereby the drive torque transmittable by the pilot friction clutch 32 may be lowered.

SUMMARY OF THE INVENTION

Accordingly, it is a primary object of the present invention to provide an improved drive power transmission device capable of transmitting a required torque with a smaller number of clutch plates of a pilot friction clutch so that the transmission device can be made small in size and reduced in cost.

Briefly, a drive power transmission device according to the present invention is provided with a drive mechanism for transmitting a drive power between first and second rotary members rotatable relative to each other, by the operation of an electromagnetic type clutch mechanism which brings a friction clutch into connection. The friction clutch has plural friction contact surfaces, and a magnetic path generated around an electromagnet of the electromagnetic type clutch mechanism includes a clutch magnetic path whose magnetic flux passes to reciprocate plural times across the friction clutch.

With this construction, the clutch magnetic path is generated so that the magnetic flux passes to reciprocate plural times across the friction clutch. Thus, the friction contact force generated between the pilot outer and inner plates of the electromagnetic type clutch mechanism are strengthened. Consequently, the electromagnetic type clutch mechanism can be constructed with a smaller number of friction clutch plates and can be made small in size and reduced in cost.

In another aspect of the present invention, there is provided a drive power transmission device having a drive mechanism for transmitting a drive power between first and second rotary members rotatable relative to each other, by the operation of an electromagnetic type clutch mechanism which brings a friction clutch into connection. A magnetic path generated around an electromagnet of the electromagnetic type clutch mechanism includes a clutch magnetic path whose magnetic flux passes to reciprocate plural times across the friction clutch, and diamond-like carbon surface treatment is given on a part or all of the friction contact surfaces of the friction clutch.

With this construction, the magnetic flux which passes to reciprocate plural times across the friction clutch strengthens the friction contact force generated between the pilot outer and inner plates of the electromagnetic type clutch mechanism, and the durability life of the pilot outer and inner plates is extended by the diamond-like carbon surface treatment on a part or all of the friction contact surfaces of the friction clutch. Accordingly, the drive power transmission device can be made smaller in size, nevertheless the durability life of the device can be maintained long.

BRIEF DESCRIPTION OF THE ACCOMPANYING DRAWINGS

The foregoing and other objects and many of the attendant advantages of the present invention may readily be appreciated as the same becomes better understood by reference to preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

An embodiment of a drive power transmission device according to the present invention will be described hereinafter with reference to FIGS. 1 to 9.

Figure 1:
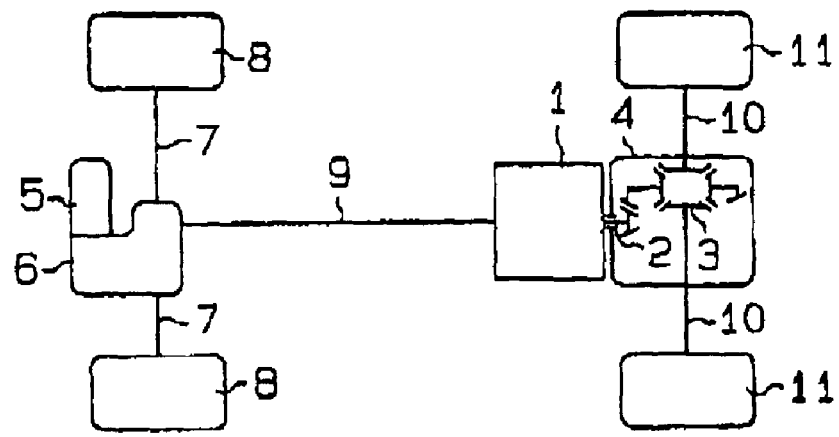
FIG. 1 is a schematic view showing the general construction of a drive system in a four-wheel drive vehicle.
Figure 2:
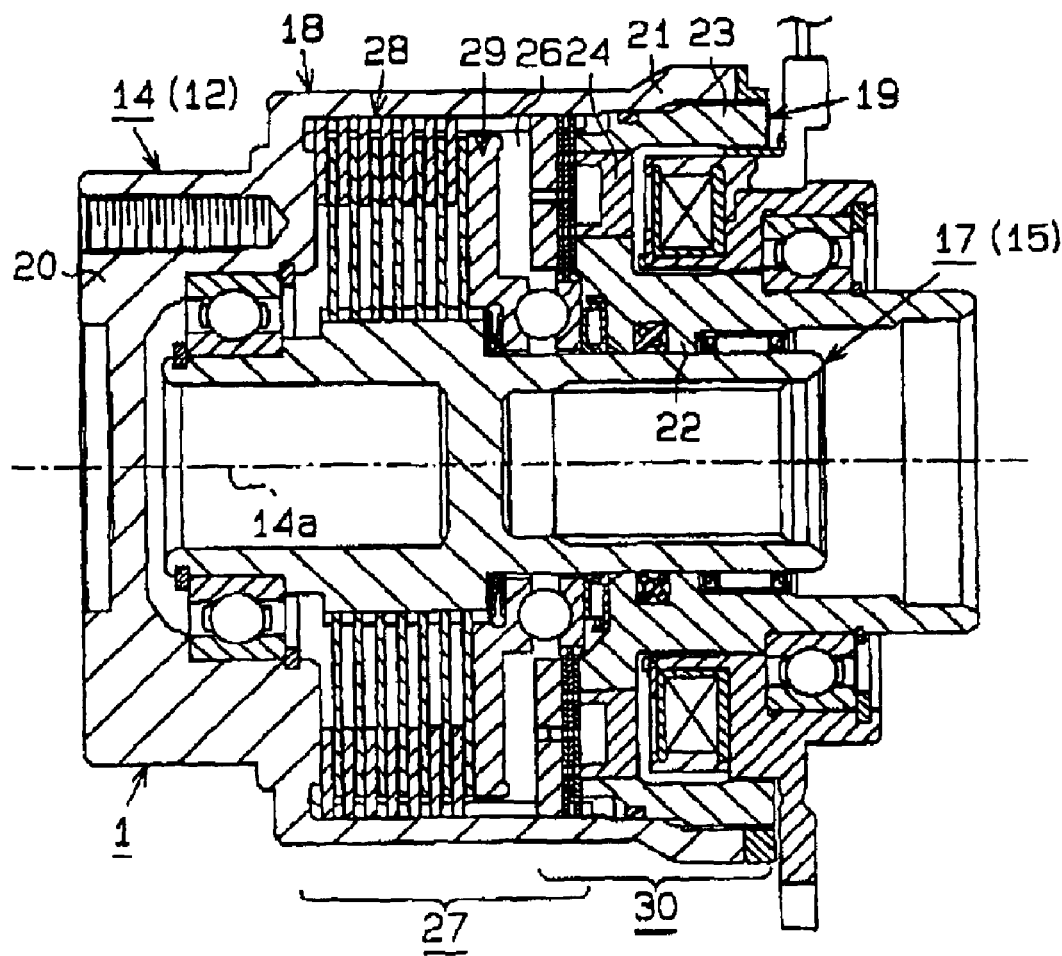
FIG. 2 is a sectional view of a drive power transmission device in one embodiment according to the present invention.
Figure 3:
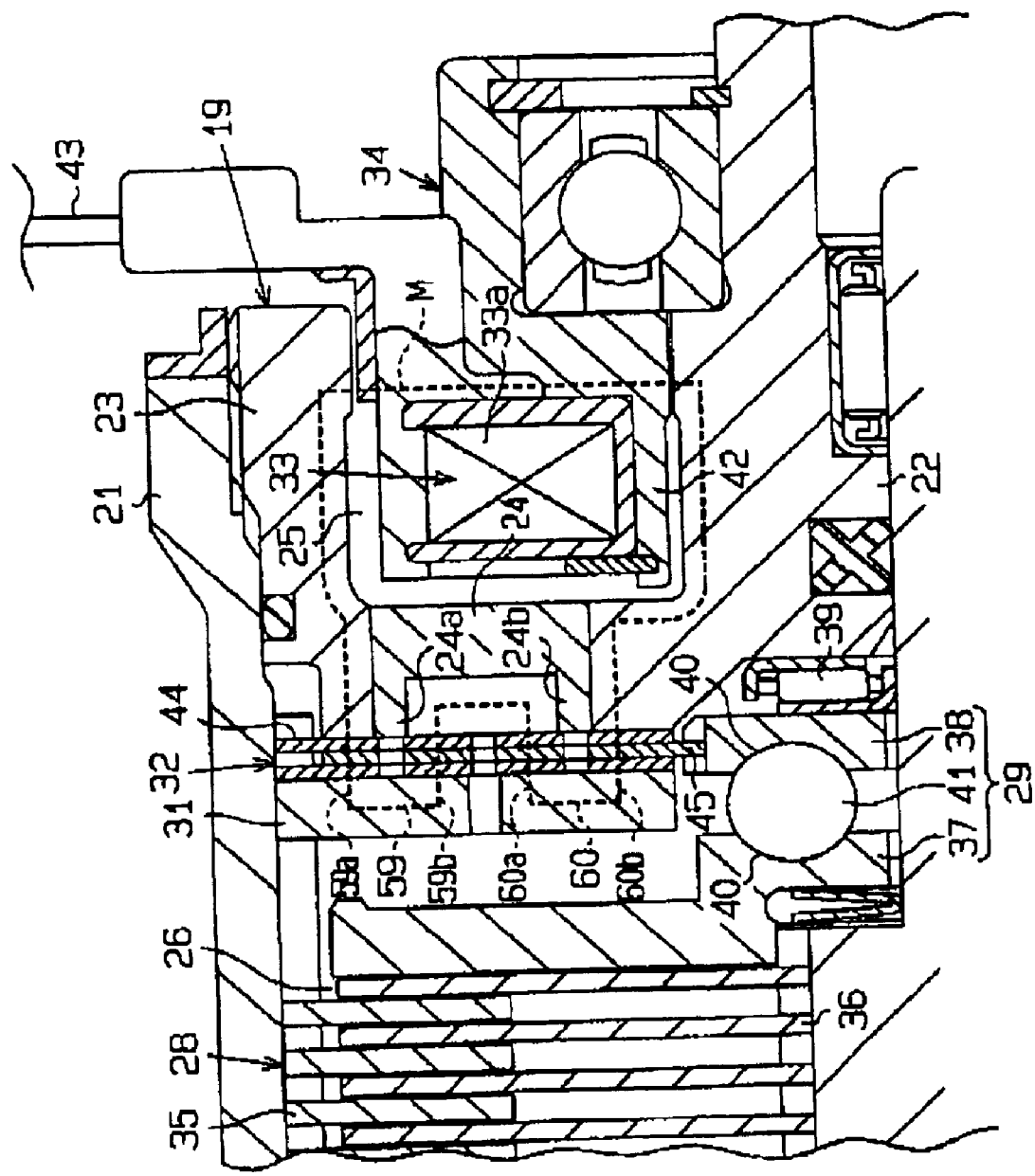
FIG. 3 is an enlarged fragmentary sectional view of a part show in FIG. 2.

In a four-wheel drive vehicle schematically shown in FIG. 1, a drive power transmission device 1 also shown in FIGS. 2 and 3 is constituted by an electronically controlled torque transmission device which generates a torque depending on an electric current applied to an electromagnet 33, and is used in a four-wheel drive vehicle which is based on a front wheel drive. The drive power transmission device 1 is connected to a rear differential 3 through a drive pinion shaft 2 and is mounted on a vehicle body by being supported by a differential carrier 4 housing the rear differential 3. The drive power of an engine 5 is output by way of a transaxle 6 to axle shafts 7 to drive both of the front wheels B. The transaxle 6 is connected to the aforementioned drive power transmission device 1 through a propeller shaft 9. When the propeller shaft 9 and the drive pinion shaft 2 are connected by the drive power transmission device 1 thereby to transmit a torque, the drive power of the engine 5 is transmitted from the rear differential 3 to both of rear wheels 11 through axle shafts 10

Referring now to FIGS. 2 and 3, a first rotary member 12 is constituted by an outer case 14 connected to the propeller shaft 9 which is given a linkage with the drive train for the front wheels 8 serving as drive wheels. A second rotary member 15 is constituted by an inner case 17 connected to the drive pinion shaft 2 which is given a linkage with the drive train for the rear wheels 11 serving as driven wheels. The outer case 14 is composed of a front housing 18 at outside and a rear housing 19 at inside and is rotatable relative to the inner case 17 about the rotational center axis 14a, about which the inner case 17 is also rotatable. The front housing 18 is formed with a front end wall portion 20 and a cylindrical external wall portion 21. The rear housing 19 is formed with an inner cylindrical portion 22, an outer cylindrical portion 23, each made of a magnetic material, and an isolation wall portion 24 made of a non-magnetic material. The inner cylindrical portion 22 is carried rotatably relative to the external surface of the inner case 17. The outer cylindrical portion 23 is inserted into, and secured to, the external wall portion 21 of the front housing 18 for bodily rotation therewith.

As best shown in FIG. 3, the isolation wall portion 24 is arranged between the inner cylindrical portion 22 and the outer cylindrical portion 23 and is formed with an outer cylindrical isolation portion 24a and an inner cylindrical isolation portion 24b. The isolation wall portion 24 is constituted by being beam welded to and between the inner cylindrical portion 22 and the outer cylindrical portion 23 by the agency of a welding material made of, e.g., stainless steel, or by being cast between the inner cylindrical portion 22 and the outer cylindrical portion 23 both made of copper. The rear housing 19 is formed with a rear-side receiving chamber 25, which is defined by the inner cylindrical portion 22, the outer cylindrical portion 23 and the isolation wall portion 24 throughout the whole circumferential length of the inner case 17.

A front receiving chamber 26 is defined by the inner case 17, the front housing 18 and the rear housing 19 to provide a closed annular space around the inner case 17. The front receiving chamber 26 contains therein a friction clutch 28 of a main clutch mechanism 27 constituting a drive mechanism, and a cam mechanism 29. The chamber 26 also contains therein an armature 31 and a pilot friction clutch 32 of the electromagnetic type clutch mechanism 30 constituting a drive mechanism. The rear-side receiving chamber 25 in the rear housing 19 has inserted therein an electromagnet 33 and a yoke 34 of the electromagnetic type clutch mechanism 30.

The main friction clutch 28 of the main clutch mechanism 27 is constituted by a multiple plate clutch, which includes plural outer plates 35 (main outer plates) and plural inner plate 36 (main inner plates). The outer plates 35 are spline-engaged with the internal surface of the cylindrical external portion 21 of the front housing 18 defining the outer case 14 and are arranged one after another in the direction of the rotational center axis 14a. Thus, the outer plates 35 are rotatable bodily with the outer case 14 and are movable relative to the outer case 14 in a direction of the rotational center axis 14a. The inner plates are spline-engaged with the external surface of the inner case 17 and are arranged in alternate fashion with the outer plates 35 in the direction of the rotational center axis 14a. Thus, the inner plates 36 are rotatable bodily with the inner case 17 and are movable relative to the inner case 17 in the direction of the rotational center axis 14a.

The cam mechanism 29 of the main clutch mechanism 27 is composed of a plate-like main cam member 37 and a plate-like pilot cam member 38. The main cam member 37 is arranged coaxially with the rotational center axis 14a in an abutting engagement with the main friction clutch 28. The pilot cam member 38 is arranged coaxially with the rotational center axis 14a in an abutting engagement with the inner cylindrical portion 22 of the rear housing 19 with a needle bearing interposed therebetween. The main cam member 37 and the pilot cam member 38 are rotatable relative to each other about the rotational center axis 14a. The pilot cam member 38 is supported to rest on the needle bearing 39, so that it is rotatable relative to the inner case 17 and the outer case 14 but is restrained from axially moving on the rotational center axis 14a. The main cam member 37 is spline-engaged with the external surface of the inner case 17 for bodily rotation therewith and is axially movable on the rotational center axis 14a thereby to pressure the inner plates 36 of the main friction clutch 28. At facing surfaces of the main cam member 37 and the pilot cam member 38, plural pairs of mating cam surfaces 40 are arranged at equlangular intervals about the rotational center axis 14a. A sphere cam member 41 is interposed between each pair of the mating cam surfaces 40 in contact with the cam surfaces 40.

The yoke 34 of the electromagnetic type clutch mechanism 30 is formed with a coil holding portion 42 supporting the electromagnet 33. A lead 43 from the electromagnet 33 is taken outside the rear housing 19. The armature 31 of the electromagnetic type clutch mechanism 30 is made of a magnetic material and is interposed between the main cam member 37 and the isolation wall portion 24 of the rear housing 19 around the pilot cam member 38. The armature 31 is spline-engaged with the internal surface of the cylindrical external wall portion 21 of the front housing 18, so that it is rotatable bodily with the outer case 14 and movable relative thereto on the rotational center axis 14a. The pilot friction clutch 32 of the electromagnetic type clutch mechanism 30 is made of a magnetic material and is composed of two outer plates 44 (pilot outer plates) and one inner plate 45 (pilot inner plate) and is interposed between the armature 31 and the isolation wall portion 24 around the pilot cam member 38. The two outer plates 44 are spline-engaged with the internal surface of the cylindrical external wall portion 21 of the front housing 18 and are rotatable bodily with the outer case 14 and movable relative thereto on the rotational center axis 14a. The one inner plate 45 is spline-engaged with the external surface of the pilot cam 38 between the two outer plates 44 to be rotatable bodily with the pilot cam 38 but movable relative thereto on the rotational center axis 14a.

Figure 4:
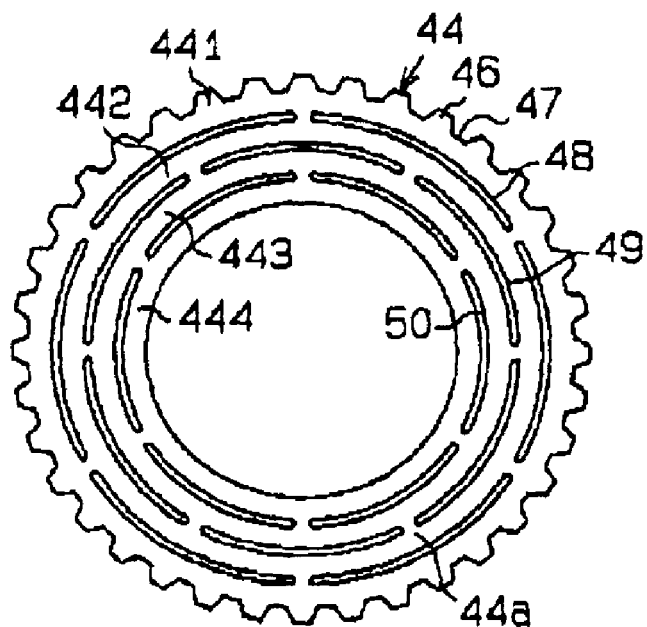
FIG. 4 is a side view of each of outer plates composing a pilot friction clutch of an electromagnetic type clutch mechanism incorporated into the transmission device shown in FIG. 2.
Figure 5:
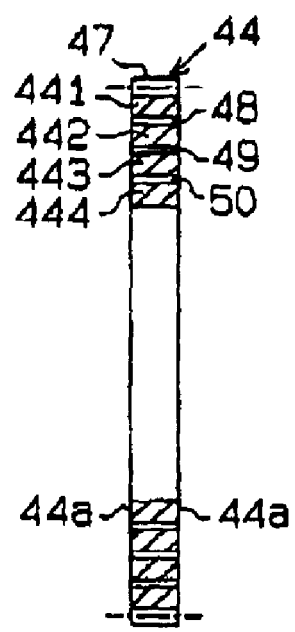
FIG. 5 is a sectional view of each outer plate shown in FIG. 4.

As shown in FIGS. 4 and 5, each of the outer plates 44 of the pilot friction clutch 32 is formed with tooth grooves 47 each between every two adjoining spline teeth 46 in the circumferential direction thereof. Each outer plate 44 is formed with slits 48–50 on triple different diameter circles between the tooth grooves 47 and the internal surface in the radial direction. The slits 48–50 on the triple circles comprise outer slits 48, intermediate slits 49 and inner slits 50. The slits 48, 49, 50 (i.e., partitioning spaces) on the respective circles are divided in the circumferential direction to take the form of arc slits.

Figure 6:
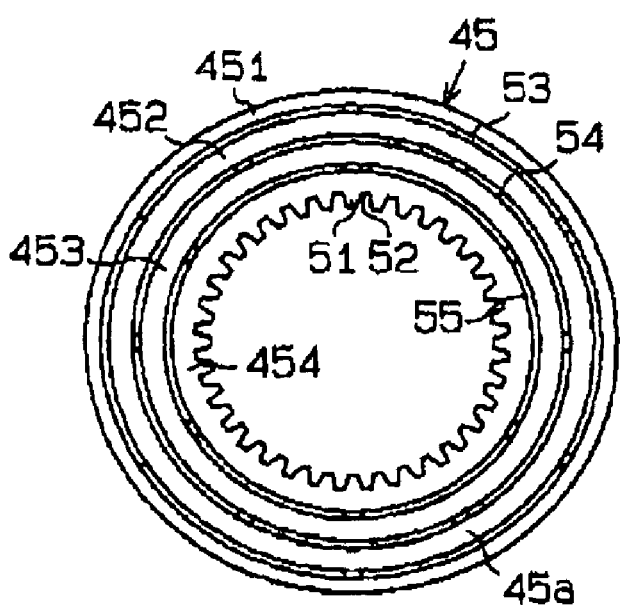
FIG. 6 is a side view of an inner plate composing the pilot friction clutch.
Figure 7:
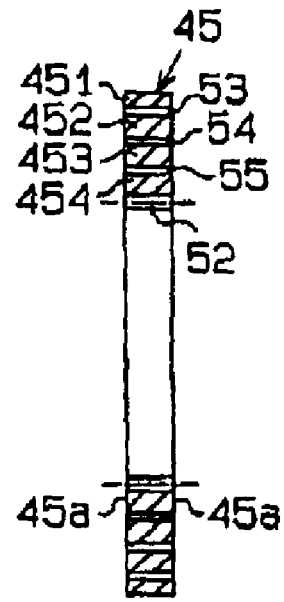
FIG. 7 is a sectional view of the inner plate shown in FIG. 6.

As shown in FIGS. 6 and 7, the inner plate 45 of the pilot friction clutch 32 is formed with spline teeth 51 at its internal surface and inner tooth grooves 52 each between every two adjoining spline teeth 51. The inner plate 45 is formed with slits 53–55 on triple different diameter circles between the inner tooth grooves 52 and the external surface in the radial direction. The slits 53–55 comprise outer slits 53, intermediate slits 54 and the inner slits 65. The slits 53, 54 and 56 (i.e., partitioning spaces) on the respective circles are divided in the circumferential direction to take the form of arc slits. Since the triple circles for the slits 48–50 correspond in diameter respectively to those for the slits 53–55, so that the outer slits 48, the intermediate slits 49 and the inner silts 50 of each outer plate 44 are superimposed respectively on the outer slits 53, the intermediate slits 54 and the inner slits 55 of the inner plate 45.

In each of the outer plates 44, as shown in FIGS. 4 and 5, magnetic path areas 441, 442, 443 and 444 are defined respectively between the outer tooth grooves 47 and the outer slits 48, between the outer slits 48 and the intermediate slits 49, between the intermediate slits 49 and the inner slits 50 and between the inner slits 50 and the internal surface. Likewise, in the inner plate 45, as shown in FIGS. 6 and 7, magnetic path areas 451, 452, 453 and 454 are defined respectively between the external surface and the outer slits 53, between the outer slits 53 and the intermediate slits 54, between the intermediate slits 54 and the inner slits 55 and between the inner slits 65 and the inner toothed grooves 52. Further, the outer cylindrical isolation portion 24a of the isolation wall portion 24 is superimposed on the outer slits 48, 53 of the outer plates 44 and the inner plate 45, and the inner cylindrical isolation portion 24b of the isolation wall portion 24 is superimposed on the inner slits 50, 55 of the outer plates 44 and the inner plate 45.

Figure 8:
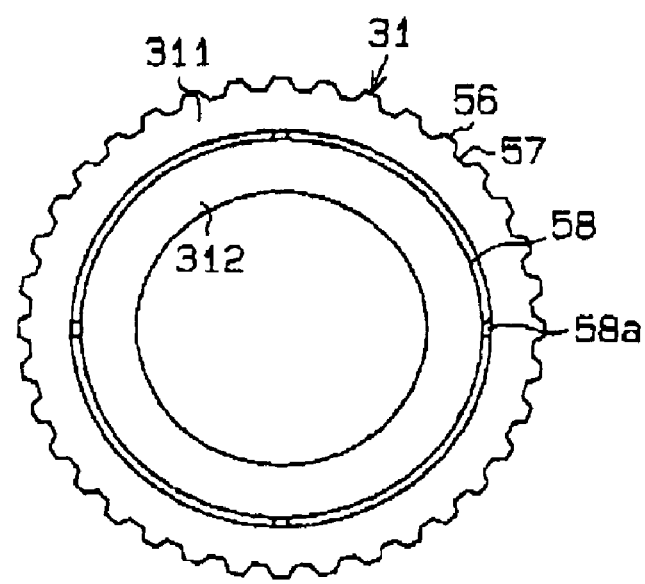
FIG. 8 is a side view of an armature composing the pilot friction clutch.
Figure 9:
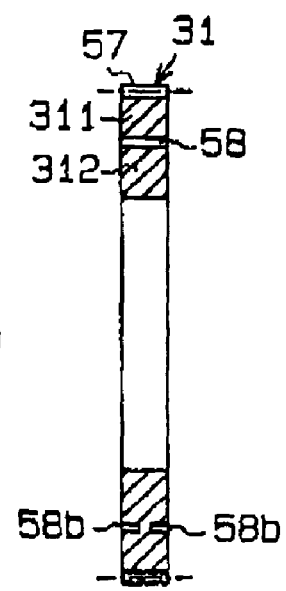
FIG. 9 is a sectional view of the armature shown in FIG. 8.

As shown in FIGS. 8 and 9, the armature 31 is formed with outer tooth grooves 57 each between every two adjoining spline teeth 56 and is also formed with slits 58 on a circle between the outer tooth grooves 57 and the internal surface in the radial direction. With the slits 58 (i.e., partitioning spaces), an outer magnetic path area 311 and an inner magnetic path area 312 are partitioned and defined between the tooth grooves 57 and the internal surface in the radial direction. The slits 58 are separated in the circumferential direction to take the form of arc slits. Connection portions 58a each between every two adjoining slits 58 in the circumferential direction are formed with cave portions 58b at both sides of the armature 31 thereby to be made thin. The slits 58 are superimposed on the intermediate slits 49, 54 of the outer plates 44 and the inner plate 45, and these slits 58, 49, 54 are on the circle between the circles respectively defining the outer and inner cylindrical isolation portions 24a, 24b of the isolation wall portion 24, so that they open between the outer and inner cylindrical isolation portions 24a, 24b in the radial direction.

A surface treatment is given to form a hard amorphous film of diamond-like carbon (DLC) on friction contact surfaces 44a defined at the both axial end surfaces 44a of the outer plates 44. On the other hand, another surface treatment for gas soft-nitriding using a special gas is given on the friction contact surfaces 45a of the inner plate 45. Besides, it may be practiced to effect the gas soft-nitriding surface treatment using the special gas on the friction surfaces 44a of the outer plates 44 and to effect the diamond-like carbon (DLC) surface treatment on the friction contact surfaces 45a of the inner plate 45, or to effect the diamond-like-carbon (DLC) surface treatment on the friction contact surfaces 44a, 45a of the outer and inner plates 44, 45. As the diamond-like-carbon (DLC), there may be used the one containing silicon (Si).

When an electric current is applied to the coil 33a of the electromagnet 33 constituting the electromagnetic type clutch mechanism 30, a magnetic path (M) schematically shown by the broken line in FIG. 3 is generated around the electromagnet 33. This magnetic path (M) passes through the inner cylindrical portion 22 and the outer cylindrical portion 23 of the rear housing 19, the yoke 34, the pilot friction clutch 32 and the armature 31 and so on. With the magnetic path (M) so generated, the armature 31 is attracted toward the electromagnet 33 to bring the pilot friction clutch 32 into friction contact, whereby the pilot cam member 38 of the cam mechanism 29 constituting the main clutch mechanism 27 is rotated in the same direction as the outer case 14 rotates. When a relative rotation is generated between the outer case 14 rotating bodily with the propeller shaft 9 and the inner case 17 rotating bodily with the drive pinion shaft 2, a torque is generated on the pilot cam member 38 as a result of the friction contact of the pilot friction clutch 32. This causes each of the spherical cam members 41 to come into contact with the associated cam surfaces 40 provided between the pilot cam member 38 and the main cam member 37 rotating bodily with the inner case 17. As a relative rotation takes place between the pilot cam member 38 and the main cam member 37, a thrust force in the direction of the rotational center axis 14a is applied to the main cam member 37. In dependence on, or proportion to, the thrust force, the main friction clutch 28 is brought into connection, whereby a drive power is transmitted between the outer case 14 rotating bodily with the propeller shaft 19 and the inner case 17 rotating bodily with the drive pinion shaft 12. In this case, the attraction force is varied in dependence on, or proportion to, the magnitude of the electric current applied to the coil 33a of the electromagnet 33, and the torque generated by the cam mechanism 29 is varied in dependence on the attraction force, so that the drive power to be transmitted is adjusted by controlling the magnitude of the electric current applied to the coil 33a.

On the contrary, in the state that no electric current is applied to the coil 33a of the electromagnet 33 constituting the electromagnetic type clutch mechanism 30, the aforementioned magnetic path (M) is not generated around the electromagnet 33, the armature 31 is released from being attracted toward the electromagnet 33. In this state, when the relative rotation takes place between the outer plates 44 and the inner plate 45 in the pilot friction clutch 32, the main cam member 37 in the cam mechanism 29 is rotated bodily with the pilot cam member 38 through the spherical cam members 41 without being pressed on the main friction clutch 28. Thus, the main friction clutch 28 remains out of connection, so that no drive power is transmitted between the outer case 4 rotating bodily with the propeller shaft 19 and the inner case 17 rotating bodily with the drive pinion shaft 12.

Figure 13:
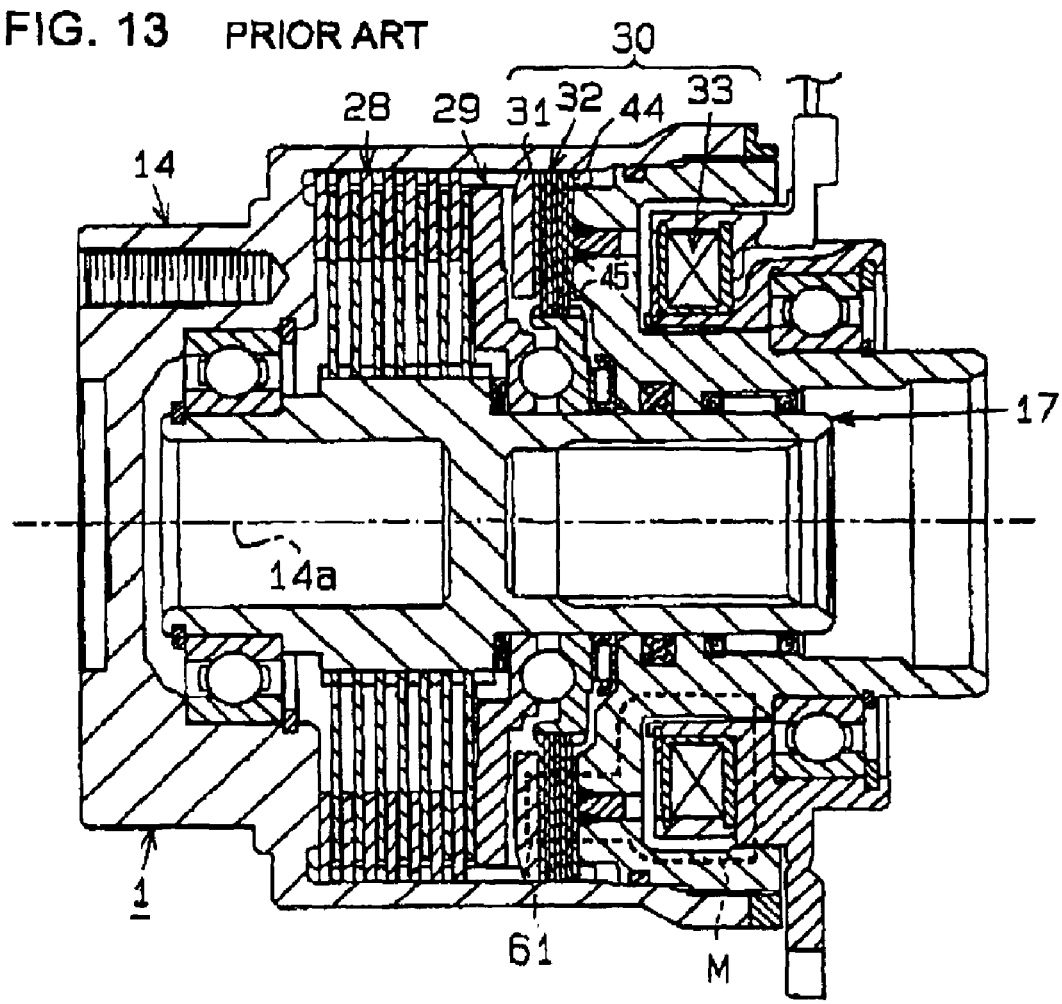
FIG. 13 is a sectional view of a drive power transmission device known as prior art.
Figure 14:
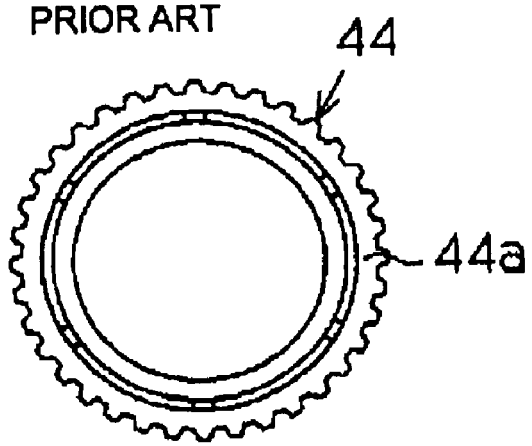
FIG. 14 is a side view of each of outer plates used in the prior art device shown in FIG. 13.
Figure 15:
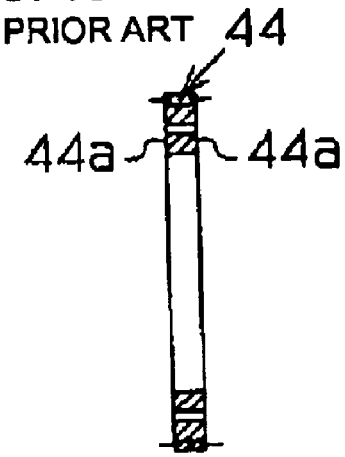
FIG. 15 is a sectional view of each outer plate shown in FIG. 14.
Figure 16:
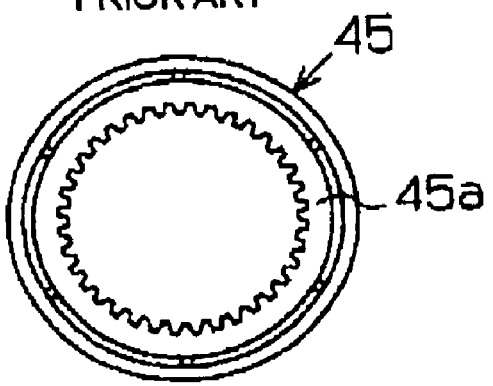
FIG. 16 is a side view of each of inner plates used in the prior art device shown in FIG. 13.
Figure 17:
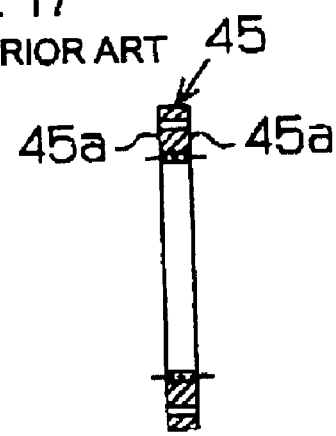
FIG. 17 is a sectional view of each inner plate shown in FIG. 16.
Figure 18:
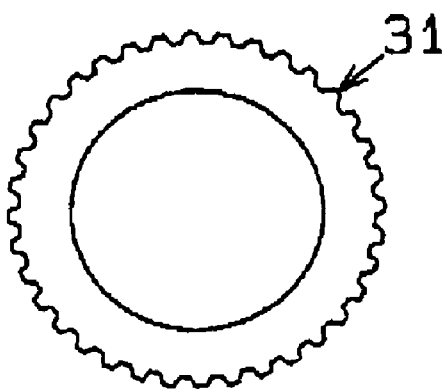
FIG. 18 is a side view of an armature used in the prior art device shown in FIG. 13.
Figure 19:
FIG. 19 is a sectional view of the armature shown in FIG. 18.

The magnetic path (M) includes a clutch magnetic path whose magnetic flux passes to reciprocate twice across the pilot friction clutch 32, as illustrated in FIG. 3 wherein the clutch magnetic path further includes a first clutch magnetic path and a second clutch magnetic path respectively indicated at 59 and 60. The outward part 59a of the first clutch magnetic path 59 passes through the magnetic path areas 441, 451 (shown in FIGS. 4–7) of the outer plates 44 and the inner plate 45 and the outer magnetic path area 311 (shown in FIGS. 8 and 9) of the armature 31. The homeward part 59b of the first clutch magnetic path 59 passes through the outer magnetic path area 311 (shown in FIGS. 8 and 9) of the armature 31 and the magnetic path areas 442, 452 (shown in FIGS. 4–7) of the outer plates 44 and the inner plate 46. The outward part 60a of the second clutch magnetic path 60 passes through the magnetic path areas 443, 453 (shown in FIGS. 4–7) of the outer plates 44 and the inner plate 45 and the inner magnetic path area 312 (shown in FIGS. 8 and 9) of the armature 31. The homeward part 60b of the second clutch magnetic path 60 passes through the inner magnetic path area 312 (shown in FIGS. 8 and 9) of the armature 31 and the magnetic path areas 444, 454 (shown in FIGS. 4–7) of the outer plates 44 and the inner plate 45. Where the magnetic flux passes to reciprocate twice across the pilot friction clutch 32 in this manner, the attraction force generated between the friction contact surfaces 44a of the two outer plates 44 and the friction contract surfaces 45a of the one inner plate 45 becomes twice as strong as it is generated in the prior art device shown in FIG. 13 wherein the magnetic flux of the magnetic path (M) passes to reciprocate once only across the pilot friction clutch 32.

Figure 10:
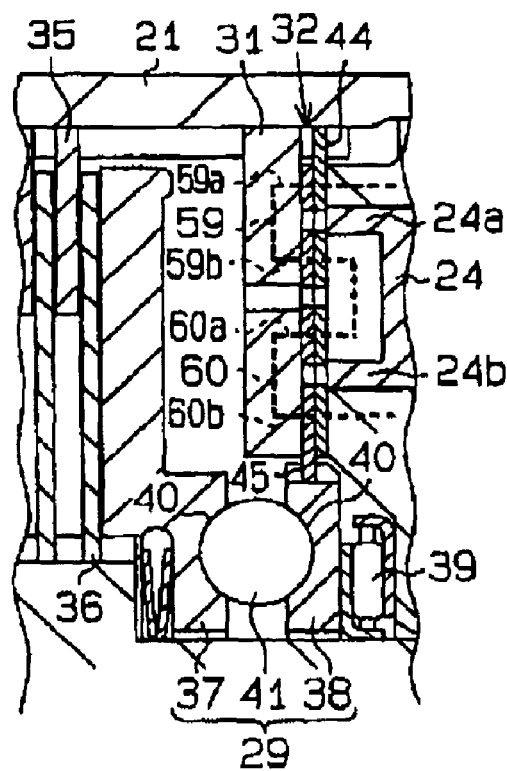
FIG. 10 is an enlarged fragmentary sectional view showing a part of a modified form of the embodiment.
Figure 11:
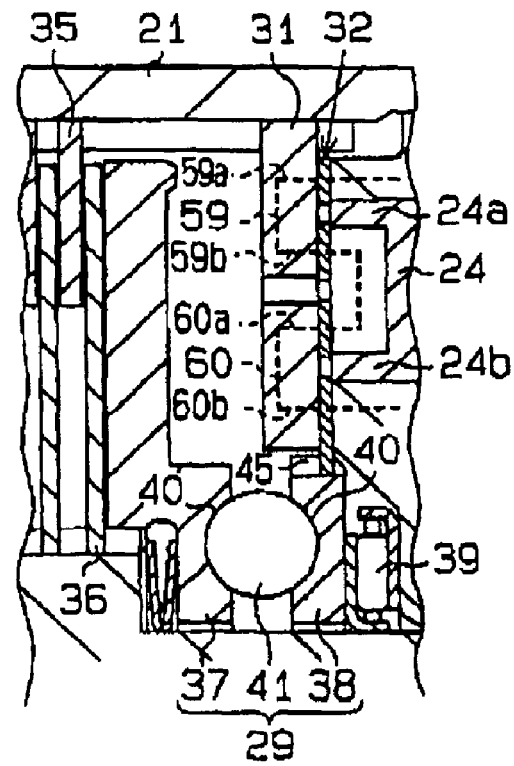
FIG. 11 is an enlarged fragmentary sectional view showing a part of another modified form of the embodiment.

In a first modified form of the embodiment shown in FIG. 10, the pilot friction clutch 32 is composed of one outer plate 44 and one inner plate 45. Further, in a second modified form of the embodiment shown in FIG. 11, the pilot friction clutch 32 is composed of one inner plate 45 which is in position to directly contact to the armature 31. Like the aforementioned first embodiment, these modified forms take the configuration that the pilot friction clutch 32 is provided with at least two contact surfaces.

Figure 12:
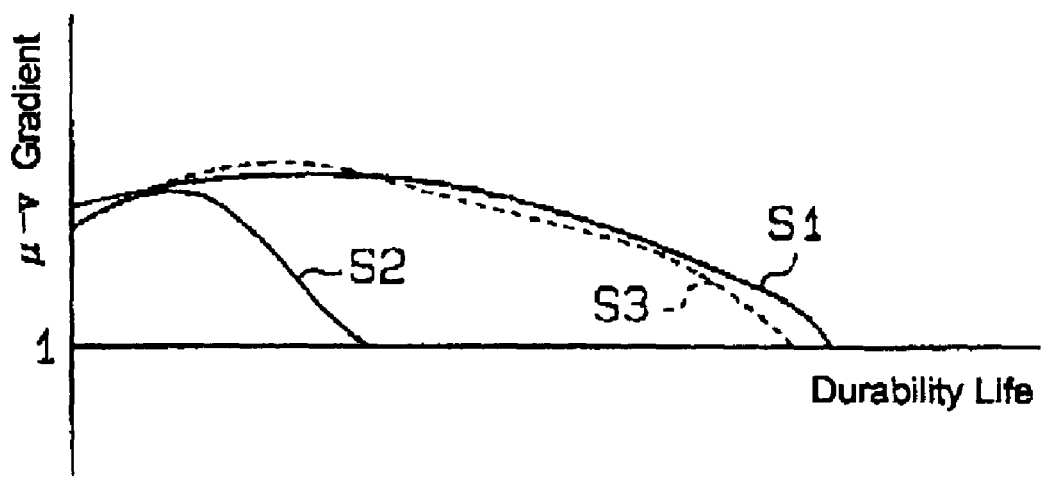
FIG. 12 is a graph comparatively showing the durability lives of samples S1 to S3 on the basis of $\mu$-v gradient.

FIG. 12 is a graph which comparably shows the durability lives of the following samples S1 to S3 on the basis of $\mu$-v gradient (i.e., the dependence characteristic of friction coefficient ($\mu$) on speed (v)). The sample S1 takes the same construction as the foregoing embodiment wherein the magnetic flux (M) passes to reciprocate twice across the pilot friction clutch 32 composed of two outer plates 44 and one inner plate 45, as shown in FIG. 3, in this sample 81, the friction contact surfaces 44a of the outer plates 44 are given the aforementioned diamond-like carbon (DLC) surface treatment, while the friction contact surfaces 45a of the inner plate 45 are given the aforementioned gas soft-nitriding surface treatment using the special gas. The sample S2 is different from the sample S1 only in that the friction contact surfaces 44a, 45a of the outer and inner plates 44, 45 are both given the gas soft-nitriding surface treatment using the special gas. The sample S3 takes the same construction as the prior art device shown in FIG. 13 wherein the magnetic flux (M) passes to reciprocate once across the pilot friction clutch 32 composed of four outer plates 44 and three inner plates 45. In this sample S3, the friction contact surfaces 44a, 45a of the outer and inner plates 44, 45 are both given the gas soft-nitriding surface treatment using the special gas.

Where the sample S1 is compared with the sample S2 which are the same in the number of the plates 44, 45, they have a large durable surface pressure because they are of the type that the magnetic flux passes to reciprocate twice. However, concerning the durability lives thereof, the sample S2 in which only the gas soft-nitriding surface treatment using the special gas is given on the pilot friction clutch 32 is shorter in life than the sample S1 given the DLC surface treatment. Accordingly, it is understood that the DLC surface treatment is effective to extend the durability life of the pilot friction clutch 32.

Where the sample S2 is compared with the sample S3 which are both given only the gas soft-nitriding surface treatment using the special gas, it is understood that the sample S2 in which the durability surface pressure is made large with the magnetic flux reciprocating twice becomes shorter in the durability life than the sample S3 in which the magnetic flux passes to reciprocate once, because the former is smaller in the number of the plates 44, 45 than the latter.

The sample S1 which is smaller in the number of the plates 44, 45 than the sample S3 ought to be larger in the durable surface pressure and ought to get shorter in the durability life because of the magnetic flux reciprocating twice. However, it is understood that the sample S1 can be recovered or extended in terms of the durability life owing to the DLC surface treatment and can have the same or slightly longer durability life than the sample S3 in spite of being smaller in the number of the plates 44, 45 than the sample S3.

In short, the sample S1 given the DLC surface treatment can maintain the durability life long by making the magnetic flux reciprocate twice across the pilot friction clutch 32 for a lager durable surface pressure, instead of decreasing the number of the plates 44, 45.

In the foregoing embodiment, the friction contact surfaces 44a of the outer plates 44 are given the diamond-like carbon (DLC) surface treatment, while the friction contract surfaces 45a of the inner plate 45 are given the gas soft-nitriding surface treatment using the special gas. However, because the drive power transmittable by the pilot friction clutch 32 can be strengthened by reciprocatingly passing the magnetic flux plural times across the same even in the case that the number of the plates 44, 45 composing the pilot friction clutch 32 is reduced, the aforementioned diamond-like carbon (DLC) surface treatment is not necessarily needed. Therefore, it may be practiced to give both of the friction control surfaces 44a, 45a the gas soft-nitriding surface treatment using the special gas in substitution for the diamond-like carbon (DLC) surface treatment.

As described hereinabove in detail, in the embodiment, the electromagnetic type clutch mechanism 30 generates a magnetic pass (M) including a clutch magnetic path whose magnetic flux passes to reciprocate plural times (twice in the illustrated embodiment) across the pilot friction clutch 32, as indicated at 59, 60 in FIG. 3. Therefore, the friction contact force between the outer and inner plates 44, 45 can be strengthened, so that the clutch mechanism 30 can be constructed with a smaller number of the outer and inner plates 44, 45. This advantageously results in making the electromagnetic type clutch mechanism 30 and hence, the drive power transmission device 1 small in size and reducing the manufacturing cost.

Preferably, the clutch magnetic path is generated to reciprocate at positions spaced radially from the rotational center axis 14a of the rotary members 12, 15. In a further modified form, the clutch magnetic path may be generated to reciprocate three or more times instead of reciprocating twice in the illustrated embodiment. Although the first clutch magnetic path part 59 and the second clutch magnetic path part 60 of the clutch magnetic path are generated as segments of the magnetic path (M) connected in series, they may otherwise be generated as those independent of, or parallel to, each other. Also preferably, the electromagnetic type clutch mechanism 30 may be constructed to have at least two friction contact surfaces, as exemplified in FIGS. 10 and 11.

In addition to the aforementioned improvement in the magnetic path, a part or all of the friction contact surfaces of the outer and inner plates 44, 45 are given a surface treatment to have a hard amorphous carbon film formed thereon. Preferably, this surface treatment can be practiced as the diamond-like-carbon (DLC) surface treatment. The durability lives of the outer and inner plates 44, 45 are extended with this treatment. Where the friction contact force between the outer and inner plates 44, 45 is strengthened, the surface pressure on the plates 44, 45 has to be increased, which would disadvantageously result in shortening the service life of the electromagnetic type clutch mechanism 30. This shortcoming can be overcome by effecting the surface treatment on the outer and inner plates 44, 45. Accordingly, the drive power transmission device 1 can take a small construction and run over a long service life.

In a modified form of the invention, the diamond-like-carbon (DLC) surface treatment may be given on the friction contact surfaces of either the outer plate 44 or the inner plate 45 or may be given on the friction contact surfaces of both of the plates 44, 45.

Although the foregoing embodiment is described taking as an example the drive power transmission device 1 for four-wheel drive vehicle, the present invention is not limited to the illustrated embodiment and rather, is applicable to various types of mechanisms such as stating clutch and the like for transmitting a torque between two rotational shafts.

Obviously, numerous modifications and variations of the present invention are possible in light of the above teachings. It is therefore to be understood that within the scope of the appended claims, the present invention may be practiced otherwise than as specifically described herein.

What is claimed is:

1. A drive power transmission device comprising
   first and second cylindrical rotary members coaxially arranged to be rotatable relative to each other;
   a main clutch mechanism composed of plural main outer plates rotatable bodily with said first cylindrical rotary member and plural main inner plates rotatable bodily with said second cylindrical rotary member, said main outer plates being arranged in alternate fashion with said main inner plates each for friction contact with said main inner plates adjacent thereto;
   an electromagnetic pilot clutch mechanism comprising an armature and an electromagnet for attracting said armature thereto; and
   a cam mechanism operable upon operation of said electromagnetic pilot clutch mechanism for bringing said main outer and inner plates into friction contact,
   wherein said electromagnetic pilot clutch mechanism further comprises means for generating a clutch magnetic path whose magnetic flux passes to reciprocate plural times across said electromagnetic pilot clutch mechanism,
   wherein the device further comprises a magnetic flux isolation member made of a non-magnetic material and formed with a circular groove on a surface thereof directed to said armature, wherein said electromagnetic pilot clutch mechanism further comprises a pilot inner plate, and arc slits are formed in said pilot inner plate on at least triple circles whose outermost and innermost circles respectively correspond in diameter to said magnetic flux isolation member, and
   wherein circular slits are formed in said armature.

2. The device according to claim 1, wherein said circular groove is defined by outer and inner cylindrical isolation portions arranged coaxially with each other.

3. The device according to claim 1, wherein said pilot inner plate is given diamond-like carbon surface treatment or soft-nitriding surface treatment.

4. The device according to claim 1, wherein said pilot outer plate is given diamond-like carbon surface treatment or soft-nitriding surface treatment.

5. The device according to claim 1, wherein the electromagnetic pilot clutch mechanism has an inner cylindrical portion and outer cylindrical portion, the magnetic flux isolation member is interposed between the inner and outer cylindrical portions.

6. The device according to claim 5, wherein the magnetic flux isolation member is made of stainless steel and welded to the inner and outer cylindrical portions.

7. The device according to claim 5, wherein the magnetic flux isolation member is made of copper and cast between the inner and outer cylindrical portions.

8. A drive power transmission device comprising
   first and second cylindrical rotary members coaxially arranged to be rotatable relative to each other;
   a main clutch mechanism composed of plural main outer plates rotatable bodily with said first cylindrical rotary member and plural main inner plates rotatable bodily with said second cylindrical rotary member, said main outer plates being arranged in alternate fashion with said main inner plates each for friction contact with said main inner plates adjacent thereto;

an electromagnetic pilot clutch mechanism comprising an armature and an electromagnet for attracting said armature thereto; and a cam mechanism operable upon operation of said electromagnetic pilot clutch mechanism for bringing said main outer and inner plates into friction contact, wherein said electromagnetic pilot clutch mechanism further comprises means for generating a clutch magnetic path whose magnetic flux passes to reciprocate plural times across said electromagnetic pilot clutch mechanims, wherein the device further comprises a magnetic flux isolation member made of a non-magnetic material and formed with a circular groove on a surface thereof directed to said armature, wherein circular slits are formed in said armature, wherein said electromagnetic pilot clutch mechanism further comprises pilot outer plates, and arc slits formed in said pilot outer plate on at least triple circles whose outermost and innermost circles respectively correspond in diameter to said magnetic flux isolation member.

9. A drive power transmission device comprising first and second cylindrical rotary members coaxially arranged to be rotatable relative to each other;

a main clutch mechanism composed of plural main outer plates rotatable bodily with said first cylindrical rotary member and plural main inner plates rotatable bodily with said second cylindrical rotary member, said main outer plates being arranged in alternate fashion with said main inner plates each for friction contact with said main inner plates adjacent thereto;

an electromagnetic pilot clutch mechanism comprising an armature and an electromagnet for attracting said armature thereto; and a cam mechanism operable upon operation of said electromagnetic pilot clutch mechanism for bringing said main outer and inner plates into friction contact, wherein said electromagnetic pilot clutch mechanism further comprises means for generating a clutch magnetic path whose magnetic flux passes to reciprocate plural times across said electromagnetic pilot clutch mechanism, wherein the device further comprises a magnetic flux isolation member made of a non-magnetic material and formed with a circular groove on a surface thereof directed to said armature, wherein circular slits are formed in said armature, wherein said circular groove is defined by outer and inner cylindrical isolation portions arranged coaxially with each other, wherein said electromagnetic pilot clutch mechanism further comprises a pilot inner plate, and arc slits are formed in said pilot inner plate on at least triple circles whose outermost and innermost circles respectively correspond in diameter to said outer and inner cylindrical portions of said magnetic flux isolation member, said magnetic flux isolation member being arranged in axial alignment with said pilot inner plate, with said outer and inner cylindrical portions respectively facing said arc slits on said outermost circle and said arc slits on said innermost circle of said pilot inner plate.

10. The device according to claim 9, wherein said electromagnetic pilot clutch mechanism further comprises pilot outer plates, and arc slits are formed in said pilot outer plates on at least triple circles whose outermost and innermost circles respectively correspond in diameter to said outer and inner cylindrical portions of said magnetic flux isolation member, said magnetic flux isolation member being arranged in axial alignment with said pilot outer plate, with said outer and inner cylindrical portions respectively facing said arc slits on said outermost circle and said arc slits on said innermost circle of said pilot outer plate.

* * * * *